US011263063B1

(12) United States Patent
Lamacchia et al.

(10) Patent No.: US 11,263,063 B1
(45) Date of Patent: Mar. 1, 2022

(54) METHODS AND SYSTEMS FOR DEVICE-SPECIFIC EVENT HANDLER GENERATION

(71) Applicant: Lamacchia Realty, Waltham, MA (US)

(72) Inventors: Anthony Lamacchia, Watertown, MA (US); Dave Karoly, Wilmington, MA (US); John Remby, Jr., Simsbury, CT (US)

(73) Assignee: LAMACCHIA REALTY, INC., Waltham, MA (US)

( * ) Notice: Subject to any disclaimer, the term of this patent is extended or adjusted under 35 U.S.C. 154(b) by 0 days.

(21) Appl. No.: 17/372,630

(22) Filed: Jul. 12, 2021

(51) Int. Cl.
  *G06F 9/54* (2006.01)
  *H04L 9/08* (2006.01)
  *H04L 9/32* (2006.01)

(52) U.S. Cl.
  CPC .............. *G06F 9/542* (2013.01); *G06F 9/543* (2013.01); *H04L 9/0872* (2013.01); *H04L 9/3247* (2013.01)

(58) Field of Classification Search
  CPC ..... H04L 9/0872; H04L 9/3247; G06F 9/542; G06F 9/543
  See application file for complete search history.

(56) References Cited

U.S. PATENT DOCUMENTS

| | | | |
|---|---|---|---|
| 5,864,871 A | 1/1999 | Kitain et al. | |
| 7,725,447 B2 | 5/2010 | Subramaniam et al. | |
| 8,515,936 B2 | 8/2013 | Hansen et al. | |
| 8,977,639 B2 | 3/2015 | Petrou et al. | |
| 2005/0097564 A1* | 5/2005 | Laura | G06F 9/52 719/312 |
| 2006/0059462 A1* | 3/2006 | Yamamoto | G03G 15/5079 717/115 |
| 2007/0043531 A1* | 2/2007 | Kosche | G06F 11/3471 702/182 |
| 2009/0089078 A1* | 4/2009 | Bursey | H04W 4/70 705/300 |
| 2010/0095064 A1* | 4/2010 | Aviles | H04L 67/1097 711/118 |
| 2011/0283045 A1* | 11/2011 | Krishnan | G06F 9/544 711/102 |

(Continued)

OTHER PUBLICATIONS

VMWare, VMWare Carbon Black/Developers, Jan. 8, 2021.

*Primary Examiner* — Tuan C Dao
(74) *Attorney, Agent, or Firm* — Caldwell Intellectual Property Law, LLC

(57) ABSTRACT

A system for device-specific event handler generation, includes a computing device configured to configure a first remote device to display an event handler graphic, receive a plurality of data via a data-reception event handler, retrieve at least a memory entry linked to the memory map index, divide a device identifier space into a first identifier set and a disjoint second identifier set, and configure the first remote device to generate a graphical view, wherein the graphical view includes at least a display element generated as a function of the at least a memory entry and a first selectable event graphic corresponding to a first selectable event handler, wherein the first selectable event handler is configured to trigger a first action if first remote device identifier corresponding to the first remote device matches the first identifier set and a second action if the identifier matches the second identifier set.

20 Claims, 5 Drawing Sheets

(56) References Cited

U.S. PATENT DOCUMENTS

| | | |
|---|---|---|
| 2012/0215640 A1 | 8/2012 | Ramer et al. |
| 2013/0305258 A1* | 11/2013 | Durant .................. G06F 9/4881 718/106 |
| 2014/0019439 A1 | 1/2014 | Sebata-Dempster et al. |
| 2015/0310126 A1* | 10/2015 | Steiner ................ G06F 16/9577 715/204 |
| 2016/0077926 A1* | 3/2016 | Mutalik .............. G06F 11/1453 711/162 |
| 2019/0220438 A1 | 7/2019 | Pal et al. |
| 2019/0318550 A1* | 10/2019 | Lakshamanan ........ G08G 1/012 |
| 2020/0327252 A1 | 10/2020 | McFall et al. |
| 2021/0056225 A1 | 2/2021 | Sislow et al. |

\* cited by examiner ns for device-specific
METHODS AND SYSTEMS FOR DEVICE-SPECIFIC EVENT HANDLER GENERATION

FIELD OF THE INVENTION

The present invention generally relates to the field of cryptography and security. In particular, the present invention is directed to methods and systems for device-specific event handler generation.

BACKGROUND

Access to data according to security constraints can be inefficient and can result in poor experience at end-user devices. Current solutions for presentation of material in an intuitive and user-friendly manner while adhering to security strictures are lacking.

SUMMARY OF THE DISCLOSURE

In an aspect, a system for device-specific event handler generation, includes a computing device configured to configure a first remote device to display an event handler graphic corresponding to a data-reception event handler, receive from the first remote device a plurality of data generated by the data-reception event handler, compare the data to at least a memory map index, retrieve at least a memory entry linked to the memory map index, divide a device identifier space into a first identifier set and a second identifier set as a function of the at least a memory entry, wherein the first identifier set and the second identifier set are disjoint, and configure the first remote device to generate a graphical view, wherein the graphical view includes at least a display element generated as a function of the at least a memory entry and a first selectable event graphic corresponding to a first selectable event handler, wherein the first selectable event handler is configured to trigger a first action if first remote device identifier corresponding to the first remote device matches the first identifier set and a second action if the first remote device identifier matches the second identifier set.

In another aspect, a method of device-specific event handler generation includes configuring, by a computing device, a first remote device to display an event handler graphic corresponding to a data-reception event handler, receiving, by the computing device and from the first remote device, a plurality of data generated by the data-reception event handler, comparing, by the computing device, the data to at least a memory map index, retrieving, by the computing device, at least a memory entry linked to the memory map index, dividing, by the computing device, a device identifier space into a first identifier set and a second identifier set as a function of the at least a memory entry, wherein the first identifier set and the second identifier set are disjoint, and configuring, by the computing device, the first remote device to generate a graphical view, wherein the graphical view includes at least a display element generated as a function of the at least a memory entry and a first selectable event graphic corresponding to a first selectable event handler, wherein the first selectable event handler is configured to trigger a first action if first remote device identifier corresponding to the first remote device matches the first identifier set and a second action if the first remote device identifier matches the second identifier set.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
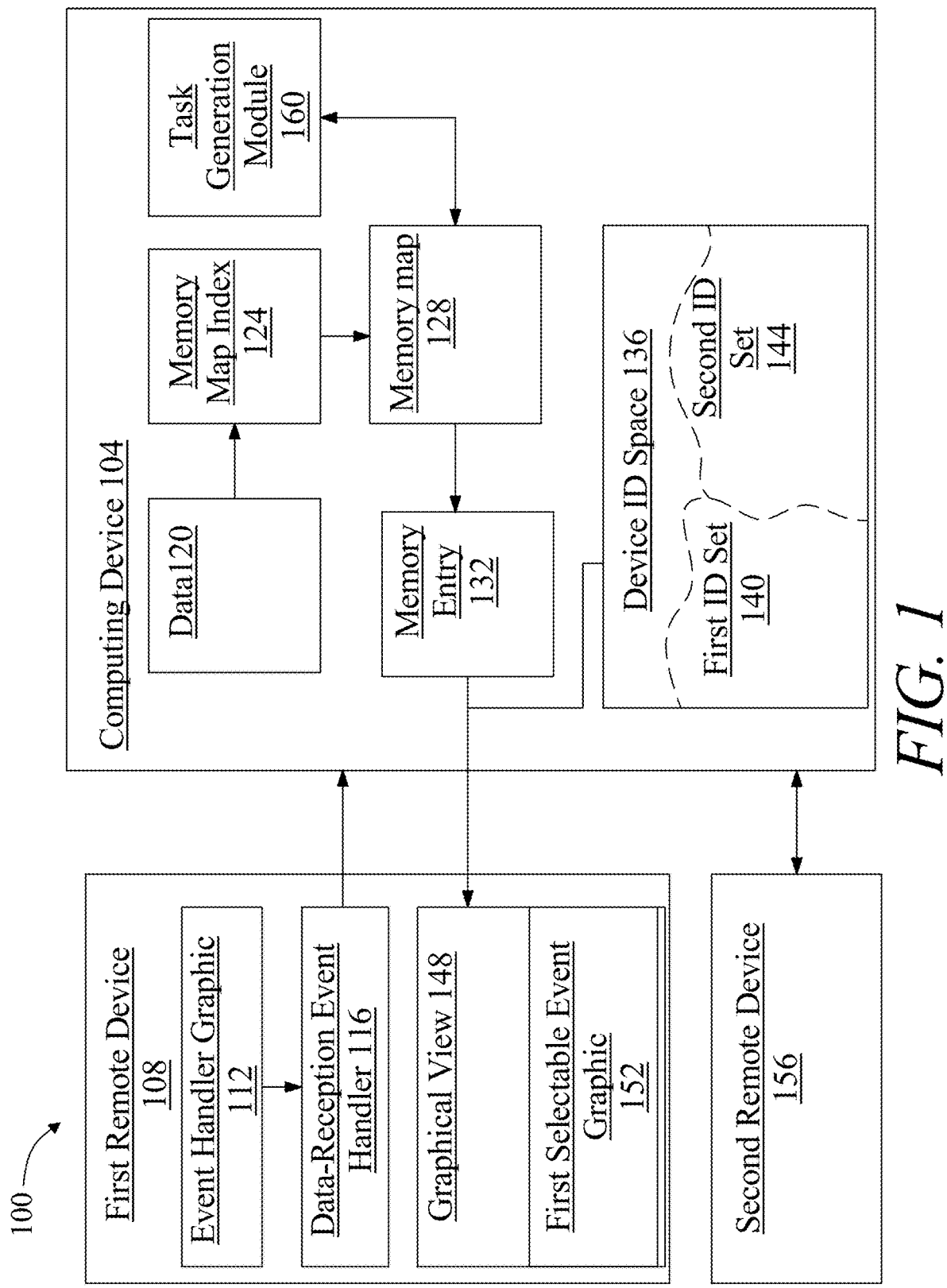
FIG. 1 is a block diagram illustrating an exemplary embodiment of a system for device-specific event handler generation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments disclosed herein partition a device identifier space into disjoint sets and generate event handler having distinct functions depending on set membership in the disjoint sets. Data received from remote devices may be used to identify set membership, select stored records from memory, and control display of such records depending on security criteria.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Referring now to FIG. 1, an exemplary embodiment of a system 100 for device-specific event handler generation is illustrated. System 100 includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to configure a first remote device 108 to display an event handler graphic 112 corresponding to a data-reception event handler 116. First remote device 108 may include, without limitation any device suitable for use as computing device 104 as described in this disclosure, including a user device such as a laptop, desktop computer, smartphone, tablet, workstation, or the like. As used in this disclosure, an "event handler graphic" is a graphical element with which a user of remote device may interact to enter data, for instance and without limitation for a search query or the like as described in further detail below. An event handler graphic 112 may include, without limitation, a button, a link, a checkbox, a text entry box and/or window, a drop-down list, a slider, or any other event handler graphic 112 that may occur to a person skilled in the art upon reviewing the entirety of this disclosure. An "event handler," as used in this disclosure, is a module, data structure, function, and/or routine that performs an action on remote device in response to a user interaction with event handler graphic 112. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like. Event handler may transmit data from remote device to computing device 104.

In an embodiment, and continuing to refer to FIG. 1, event handler may include a cross-session state variable. As used herein, a "cross-session state variable" is a variable recording data entered on remote device during a previous session. Such data may include, for instance, previously entered text, previous selections of one or more elements as described above, or the like. For instance, cross-session state variable data may represent a search a user entered in a past session. Cross-session state variable may be saved using any suitable combination of client-side data storage on remote device and server-side data storage on computing device 104; for instance, data may be saved wholly or in part as a "cookie" which may include data or an identification of remote device to prompt provision of cross-session state variable by computing device 104, which may store the data on computing device 104. Alternatively, or additionally, computing device 104 may use login credentials, device identifier, and/or device fingerprint data to retrieve cross-session state variable, which computing device 104 may transmit to remote device. Cross-session state variable may include at least a prior session datum. A "prior session datum" may include any element of data that may be stored in a cross-session state variable. Event handler graphic 112 may be further configured to display the at least a prior session datum, for instance and without limitation auto-populating user query data from previous sessions.

Still referring to FIG. 1, computing device 104 is configured to receive from the first remote device 108 a plurality of data 120 generated by the data-reception event handler 116. Plurality of data 120 may include any data entered using event handler graphic 112 and/or event handler as described above. For instance, and without limitation, plurality of data 120 may include a search query a user has constructed using event handler graphic 112, event handler, and/or a plurality of either.

With continued reference to FIG. 1, computing device 104 may be configured to derive at least a first remote device 108 location datum corresponding to a current location of the first remote device 108. As used in this disclosure, a "location datum" is an element of data describing a geographic location of a device such as first remote device 108. A location datum may include, without limitation latitude and longitude coordinates, location within a radius of given length from a reference point, location in a municipality, county, neighborhood, and/or other local polity, location within a particular building, office park, or campus, or any other location that may occur to a person skilled in the art upon reviewing the entirety of this disclosure. In some embodiments, location may be derived by retrieval of a stored prior location such as a location provided by a user of first remote device 108 and/or a location that was determined previously by any process described in this disclosure. In an embodiment, deriving first remote device 108 location datum may include receiving the first remote device 108 location datum from first remote device 108. For instance, first remote device 108 may determine and report a location of first device using, for instance satellite-based navigation systems such as the Global Positioning System (GPS) or the like, cell-tower triangulation, location at one or more local wireless transmitters having known locations such as "wi-fi" transmitters, or the like.

In an embodiment, and still referring to FIG. 1, deriving the first remote device 108 location datum may include deriving first remote device 108 location datum using internet protocol (IP) geolocation. IP geolocation, as used in this disclosure, is a mapping of IP addresses and/or media access control (MAC) addresses to particular and/or approximate geographical locations; computing device 104 may look up the particular and/or approximate geographical location of first remote device 108 upon receiving an IP and/or MAC address of first remote device 108 and/or of a modem, server, wireless communication hub, and/or other device by means of which first remote device 108 is transmitting data. Alternatively or additionally, computing device 104 may determine an approximate location of first remote device 108 by measuring network communication latency; for instance, if responses from remote device are received within a threshold amount of time, first remote device 108 may be determined to be within some maximal radius from computing device 104, and/or from a modem, server, wireless communication hub, and/or other device by means of which first remote device 108 is transmitting data. Computing device 104 may alternatively or additionally store and/or look up geographical locations associated with device fingerprint data, including fingerprint of first remote device 108, intermediary devices, or the like, where "intermediary devices" are defined as any devices by means of which first remote device 108 is transmitting data, such as a modem, server, wireless communication hub, and/or other device by means of which first remote device 108 is transmitting data. Intermediary devices may alternatively or additionally provide their geographic data, which may be used in turn to estimate a location of first remote device 108; for instance, network communication latency may be used to estimate a distance from intermediary device to first remote device 108, and/or intermediary device may communicate with first remote device 108 using local types of transmission, for instance if intermediary device is a wi-fi hub, cell tower, or the like.

With continued reference to FIG. 1, computing device 104 may be configured to determine a first remote device 108 identifier. A "device identifier," as used in this disclosure, is any element of data that identifies a remote device and/or a user thereof, including without limitation a MAC address, a serial number, a globally unique identifier (GUID) a universally unique identifier (UUID), a username, one or more user login credentials such as passwords, tokens or the like, and/or any other element suitable to identify a device and/or user thereof as described herein.

Still referring to FIG. 1, determining first remote device 108 identifier may include identifying device fingerprint data of first remote device 108 and determining the first remote device 108 identifier from the device fingerprint data. "Device fingerprint data," as used in this disclosure, is data used to determine a probable identity of a device as a function of at least a field parameter a communication from the device. At least a field parameter may be any specific value set by first remote device 108 and/or user thereof for any field regulating exchange of data according to protocols for electronic communication. As a non-limiting example, at least a field may include a "settings" parameter such as SETTINGS_READER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," 'transaction_id," and the like. Determining the identity of the first remote device 108 may include fingerprinting the first remote device 108 as a function of at least a machine operation parameter described a communication received from the first remote device 108. At least a machine operation parameter, as used herein, may include a parameter describing one or more metrics or parameters of performance for a device and/or incorporated or attached components; at least a machine operation parameter may include, without limitation, clock speed, monitor refresh rate, hardware or software versions of, for instance, components of first remote device 108, a browser running on first remote device 108, or the like, or any other parameters of machine control or action available in at least a communication. In an embodiment, a plurality of such values may be assembled to identify first remote device 108 and distinguish it from other devices.

With continued reference to FIG. 1, determining the first remote device 108 identifier may include receiving a digital signature from first remote device 108 and determining the first remote device 108 identifier from the digital signature. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 1, determining first remote device 108 identifier may include receiving a token issued by one or more third-party devices or services identifying and/or authenticating first remote device 108 and/or a user thereof, such as without limitation security assertions markup language (SAML) token from first remote device 108 and determining the first remote device 108 identifier from the SAML token. SAML) tokens are extensible markup language (XML) representations carrying statements that are sets of claims made by one entity about another entity. For example, in federated security scenarios, statements may be made by a security token service about a user and/or device in a system. A security token service may sign the SAML token, for instance using any digital signature as described above, to indicate veracity of statements contained in the token. In addition, a SAML token may be associated with secret data, such as cryptographic key material that the user of the SAML token may knowledge of, for instance using a digital circuit as described above.

Continuing to refer to FIG. 1, computing device 104 is configured to compare data to at least a memory map index 124. A "memory map index," as used herein, is an element of data usable to look up a record stored in a "memory map," which may include any data structure such as a database used for data storage and retrieval. A database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data 120 entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Computing device 104 is configured to retrieve at least a memory entry 132 linked to the memory map index 124, where a "memory entry" is a record retrieved from a memory map 128. In an embodiment, data received from first remote device 108 may be used to generate a query for retrieval of data from memory map 128; query may additionally include a device identifier such as first device identifier as described above and/or location data of first remote device 108. Location data, for instance, may be used to limit results retrieved from memory map 128 to entries pertaining to entities, objects, and/or real property located at or near a location including and/or within some threshold distance of a location of first remote device 108, for instance as described in further detail below.

Still referring to FIG. 1, computing device 104 is configured to divide a device identifier space 136 into a first identifier set 140 and a second identifier set 144 as a function of the at least a memory entry 132, wherein the first identifier set 140 and the second identifier set 144 are disjoint. A "device identifier space," as used in this disclosure, is a set of all possible device identifies usable according to whatever protocol and/or protocols system 100 employs. Division of a device identifier space 136 into two sets may be accomplished, without limitation, by identification of a membership function for membership in at least one of the two sets. Membership function may include any process for determining that a device identifier is included or excluded from the at least one set. For instance, membership function may include a look-up process whereby a relationship between a given device identifier and a given data record is determined, for instance and without limitation as described below. Alternatively, or additionally, membership function may include any mathematical calculation, including evaluation of a cryptographic process, digital signature, or the like. First identifier set 140 and second identifier set 144 are disjoint, meaning as used herein that a device identifier that is a member of first identifier set 140 is not a member of second identifier set 144.

With continued reference to FIG. 1, computing device 104 is configured to configure first remote device 108 to generate a graphical view 148. As used in this disclosure, a "graphical view" is a data structure that causes display of one or more graphical elements on a remote device such as first remote device 108. A "display element," as used in this disclosure, is an image that a program and/or data structure may cause to be displayed on a display of a remote device such as first remote device 108. Display elements may include, without limitation, windows, pop-up boxes, web browser pages, display layers, and/or any other display element that may occur to a person skilled in the art upon reviewing the entirety of this disclosure. Graphical view 148 includes at least a display element generated as a function of the at least a memory entry 132. Graphical view 148 includes a first selectable event graphic 152 corresponding to a first selectable event handler. A "selectable event graphic," as used in this disclosure, is a graphical element that upon selection using a cursor or other locator as manipulated using a locator device such as a mouse, touchscreen, track pad, joystick, or the like will trigger an action to be performed on remote device. As a non-limiting example, a selectable event graphic may include a redirection link, defined as a hyperlink, button, image, portion of an image, and/or other graphic containing or referring to a uniform resource locator (URL) and/or other resource locator to another graphical view 148 including without limitation buttons, and/or to a process that performs navigation to such URL and/or other resource locator upon selection of selectable event graphic. Redirection may be performed using any event handler, including without limitation event handlers detecting the click of a mouse or other locator, access of redirection link using a touchscreen, the selection of any key, mouseover events, or the like. First selectable event graphic 152 is configured to trigger a first action if first remote device 108 identifier corresponding to the first remote device 108 matches the first identifier set 140 and a second action if the first remote device 108 identifier matches the second identifier set 144, for instance and without limitation as described in further detail below. Configuration of first selectable event graphic 152 to perform first action and/or second action may be performed at any stage from generation of graphical view 148 to event handling after selection of selectable event graphic, such as without limitation during configuration on computing device 104, during a program, function, and/or routine triggered by selection that performs or causes to be performed membership function determinations as described above, and/or any step in between.

In an embodiment, and still referring to FIG. 1, first action may trigger display of secured data. "Secured data," as used in this disclosure, may include data that is only permitted, according to one or more access rules, to be displayed to device having device identifiers in a particular identifier set, such as first identifier set 140. Membership in an identifier set may, among other things, confer an access right to a set of secured data for instance as described in further detail below, while lack of membership in that set, and/or membership in another set that is disjoint, may deny such an access right.

With continued reference to FIG. 1, second action may generate an electronic communication to a second remote device 156. Second remote device 156 may include, without limitation, any device suitable for use as first remote device 108 as described above. Any kind of data to be collected, derived, generated, determined, received, or the like relating to first remote device 108, in any manner described in this disclosure may be similarly collected, derived, generated, determined, received, or the like in any manner relating to second device. Where first remote device 108 has a device identifier that is a member of second device identifier set, second remote device 156 may belong to first identifier set 140; where first identifier set 140 membership confers access to an element of secured data, first remote device 108 may lack access to such data, while second device may have access to secured data, or vice versa. A device not having access to secured data may instead be able to cause an electronic communication to device that does have such access. First selectable event graphic 152 may display a different image and/or textual element to a device having membership in first identifier set 140 than to a device having membership in second identifier set 144, for instance and without limitation as described in further detail below.

In an embodiment, and still referring to FIG. 1, first remote device 108 identifier may belong to first identifier set 140. Second remote device 156 may have a second remote device 156 identifier, which may include any device identifier as described above. Second device identifier may belong to second identifier set 144. In an embodiment, electronic communication may include a second selectable event graphic corresponding to a second selectable event hander. Where first remote device 108 identifier belongs to first identifier set 140. And second device identifier belongs to second identifier set 144, second selectable event graphic may be configured to trigger a first action if selected from the first remote device 108 and a second action selected from the second remote device 156. Second selectable event graphic may perform any action of first selectable event graphic 152, including without limitation provision of access to secure data based on set membership. In an embodiment, second selectable event graphic may take no action for a device that does not have access to secure data.

In some embodiments, and still referring to FIG. 1, computing device 104 may receive data from first remote device 108, for instance as described above, a single time, and iteratively perform subsequent steps and/or processes as described above based on such data, in a regularly updating process; such processes may be performed for multiple remote devices on a batched basis, for instance once a day, once a week, or the like.

Figure 2:
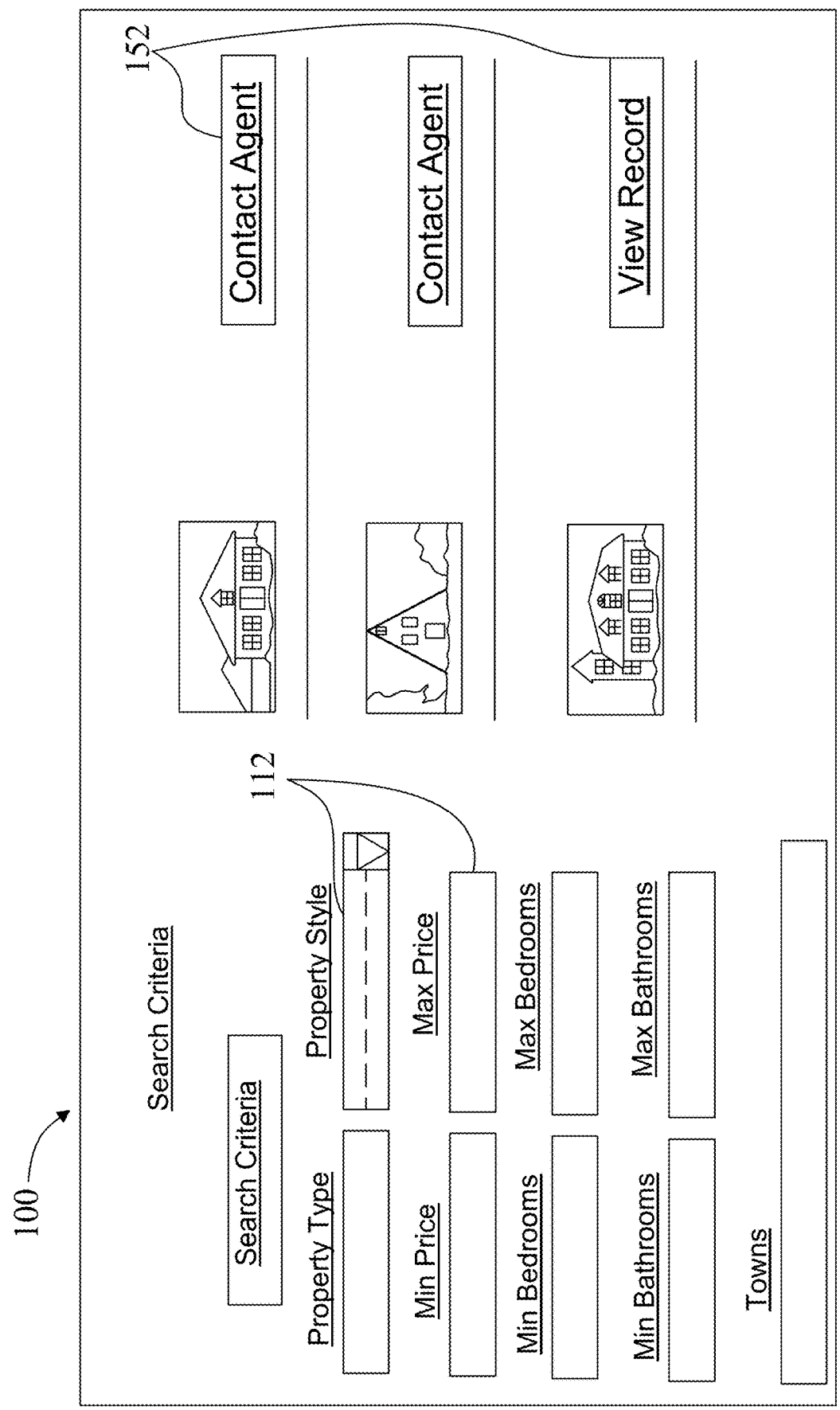
FIG. 2 illustrates an exemplary screenshot of a display with device-specific event handlers.

Referring now to FIG. 2, a non-limiting example of one or more graphical user interface (GUI) elements to be displayed on a remote device such as first remote device 108 is illustrated. GUI elements may include without limitation an event handler graphic 112 and/or a plurality thereof. Event handler graphic 112 may permit, for instance entries of one or more elements to be used in a one-time or recurring query; in this non-limiting example, a query may include a search for a real-estate property for sale, and data elements to be entered and/or selected may include elements corresponding to a property type, a property style, a minimum and/or maximum price, a minimum and/or maximum number of bathrooms, a minimum and/or maximum number of bedrooms, and/or one or more geographical preferences such as towns, cities, neighborhoods, and/or other locations in which lots and/or buildings to be searched for are located.

Still referring to FIG. 2, in a non-limiting example, results may include one or more elements of data describing a real estate property for sale or rent, including without limitation images, pricing, data relating to criteria for search queries, or the like. A first selectable event graphic 152 may include a "contact seller" button and/or link, which may generate an electronic communication as described above. A first selectable event graphic 152 may include a "view record" button or link which may reveal secured data. Secured data may include, without limitation, address information and/or other information usable to show, access, and/or sell a property; such information may be withheld from users who are not an agent currently offering property. In other words, in a non-limiting example, membership function may determine if a person and/or agent is within a first identifier set 140 representing an agent assigned to and/or offering a property or is within a second identifier set 144 which does not include such persons and/or agents; access rights to some information concerning property may be secured data linked to membership in a particular identifier set.

With continued reference to FIG. 2, properties included in search results may be limited to geographical results explicitly requested. Alternatively, or additionally, results may be limited according to a current location of first remote device 108, such as limiting results to a certain radius about first remote device 108 location, to results occupying town, city, county, or other geographical division containing first remote device 108 location, or the like. Degree of location-based limitations of results may be selectable by a user of first remote device 108 and/or may be configured on computing device 104 by one or more automated processes.

Still referring to FIG. 2, in a non-limiting example, system 100 may allow agents to search database for matches to buyer or sellers. For instance, for buyers or agents thereof, database searches performed as described above may produce results containing properties and/or leads that match buyer criteria. Searches by seller may cause production of information describing buyers looking for property they are selling. Access right limitations may function to preserve rights of agents for buyers or sellers. For instance, in some embodiments, agents may not be able to see data of other agents, such as leads, clients, property transactions, or the like. System may remove security barriers to allow a person who is not an agent corresponding to the currently displayed property to see only a subset of data, such as "property, beds, baths, agent," but not "actual property address, name of lead," or the like. Similarly, electronic communications such as emails generated from "contact agent" links may contain a link to the relevant record, which may permit selection by agent to bring up seller details but deny access searchers or the like.

Figure 3:
FIG. 3 illustrates an exemplary screenshot of a display with device-specific event handlers.

Referring now to FIG. 3, an exemplary embodiment of "seller side" results as described above for an example in which system 100 is used for real estate processes is illustrated. Data provided members of any identifier set may include names and descriptions of prospective buyers, while additional data such as contact information or the like may be restricted to agents representing a buyer; first selectable event graphic 152 may permit transmission of a message to buyer or agent of buyer for non-agents, while displaying secured and/or private data to a buyer and/or agent thereof.

In some embodiments, and without limitation, search results may be exported to one or more documents such as comma-separated value (CSV) documents, portable document format (PDF) documents, word-processor files, and/or text files. In an embodiment, data to be included in a document so generated may be determined according to identifier set membership; for instance, secure data may be included if an identifier of first remote device 108 is in a first identifier set 140, but not if it is in a second identifier set 144. Thus, for instance, a record for a given property and/or buyer may include details available for an agent thereof if generated to a device of that agent, and otherwise may not.

Further referring to FIG. 3, and as a further non-limiting example, data entered in event handler graphic 112 may include data indicating that a user such as a real estate agent and/or broker is available to aid in one or more showings of property or other tasks; such information may include one-time or recurrent times in which a person is available to perform such actions, which actions the agent and/or broker is available to perform, or the like. In an embodiment, a second division of device identifiers into non-disjoint sets may be performed according to geographic criteria. For instance, and without limitation, each individual user may have a number of quadrants assigned to that individual user. An event handler graphic 112 may similarly be provided to a person, agent, and/or broker having a property to be shown, who may enter data describing when showings are needed, how many people are needed per showing, or the like, which may be stored on memory map 128. Computing device 104 may match opportunities stored on a memory map 128 as described above to users in each quadrant covering a location and/or area in which needs exist. Computing device 104 may automatically send out an electronic communication such as an email with a selectable event graphic such as a link if such users wish to perform such showings. Selection of selectable event graphic may cause transmission of an electronic communication, which may be implemented in any manner described above for an electronic communication, to an agent who sent a request for a person to do a showing; communication may include another selectable event graphic to accept or decline such request for help. A display may list all requests for which a given agent has volunteered, and may also display all requests agent has generated, including filled and outstanding requests.

Referring again to FIG. 1, some embodiments of system 100 may include a task generation module 160. Task generation module 160 may include a step configuration tool for task allocation. Step configuration tool may operate on one or more steps, where a "step" is a data structure storing a task. Task generation module 160 may generate electronic messages relating to tasks, such as communications scheduled at different stages in a process. For instance, and without limitation, a process flow for selling a property may include generation of messages such as emails to specific parties to the transaction, such as prospective buyers and/or agents thereof, prospective sellers and/or agents thereof, real estate attorneys, banks or other lenders, mortgage brokers, or the like.

Task generation module 160 may automatically select recipients of electronic communications. For instance, and without limitation, where an agent has entered one or more persons and/or entities in roles to be performed in a set of steps for a particular process to be completed, such entities may be automatically populated into recipient fields for electronic communications. Task generation module 160 may automatically propose or fill in previously used contacts for some such fields, such as attorneys, lenders, or the like, who have performed such tasks.

Email templates may include one or more fields that are automatically populated from memory map with one or more data corresponding to such fields. For instance, template may include a string of text that may be combined with an identifier of a data record to select data to be populated in the electronic communication. Such data may include names of parties, addresses of properties, pricing, descriptions of properties, descriptions of documents attached, or the like. Attachments may be automatically appended to electronic communication; alternatively, messages prompting a user such as an agent to attach particular documents may be generated and displayed on a device operated by the agent.

In an embodiment, when a task such as transmission of an electronic communication is performed, task generation module 160 may automatically indicate that the task is closed.

Figure 4:
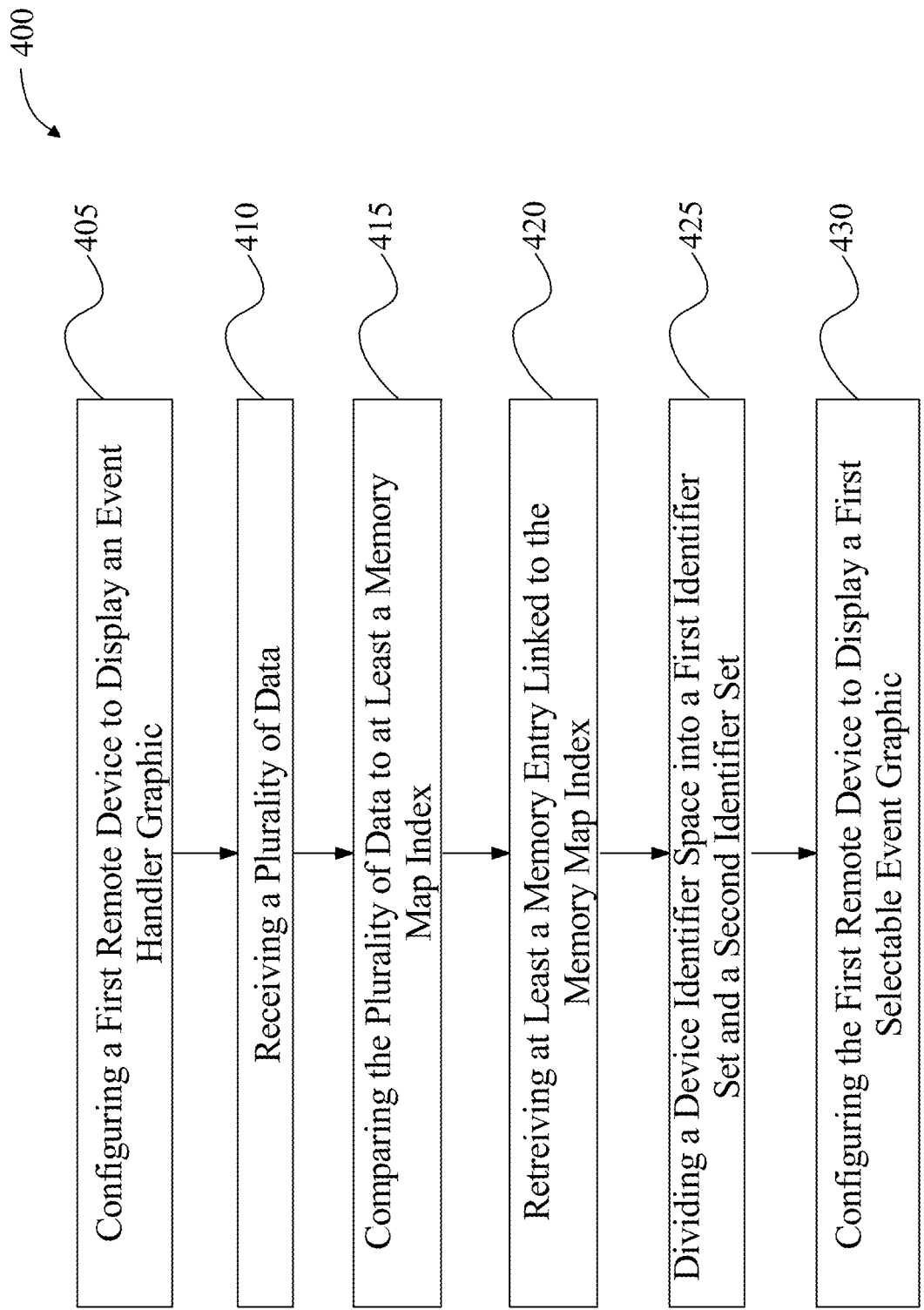
FIG. 4 flow diagram illustrating an exemplary embodiment of a method for device-specific event handler generation.

Turning now to FIG. 4, an exemplary embodiment of a method 400 of device-specific event handler generation is illustrated. At step 405, a computing device configures a first remote device to display an event handler graphic corresponding to a data-reception event handler; this may be implemented, without limitation, as described above in reference to FIGS. 1-3. Event handler may further include a cross-session state variable. Cross-section state variable may include at least a prior session datum. Event handler graphic may be further configured to display the at least a prior session datum.

At step 4, and still referring to FIG. 4, computing device receives, from the first remote device, a plurality of data 120 generated by the data-reception event handler; this may be implemented, without limitation, as described above in reference to FIGS. 1-3. Computing device may derive at least a first remote device location datum corresponding to a current location of first remote device. Deriving first remote device location datum may include receiving the first remote device location datum from the first remote device. Deriving first remote device location datum further comprises deriving the first remote device location datum using internet protocol geolocation.

Further referring to FIG. 4, computing device may be configured to determine a first remote device identifier. Determining first remote device identifier may include identifying device fingerprint data of first remote device and determining the first remote device identifier from the device fingerprint data. Determining first remote device identifier may include receiving a digital signature from first remote device and determining the first remote device identifier from the digital signature. Determining first remote device identifier may include receiving SAML token from the first remote device and determining the first remote device identifier from the SAML token.

Continuing to refer to FIG. 4, first action may trigger display of secured data. Second action may generate an electronic communication to a second remote device. First remote device identifier may belong to first identifier set. Second remote device may include a second remote device identifier that belongs to the second identifier set. Electronic communication includes a second selectable event graphic corresponding to a second selectable event hander. Second selectable event graphic may be configured to trigger a first action if selected from first remote device and a second action if selected from second remote device.

At step 4, and still referring to FIG. 4 computing device compares data to at least a memory map index; this may be implemented, without limitation, as described above in reference to FIGS. 1-3.

At step 4, and further referring to FIG. 4, computing device retrieves at least a memory entry linked to memory map index; this may be implemented, without limitation, as described above in reference to FIGS. 1-3.

At step 4, and still referring to FIG. 4, computing device divides a device identifier space into a first identifier set and a second identifier set as a function of at least a memory entry, wherein the first identifier set and the second identifier set are disjoint; this may be implemented, without limitation, as described above in reference to FIGS. 1-3.

At step 4, and with continued reference to FIG. 4, computing device configures first remote device to generate a graphical view; this may be implemented, without limitation, as described above in reference to FIGS. 1-3. Graphical view includes at least a display element generated as a function of the at least a memory entry. Graphical view includes a first selectable event graphic corresponding to a first selectable event handler, wherein the first selectable event handler is configured to trigger a first action if first remote device identifier corresponding to first remote device matches the first identifier set and a second action if the first remote device identifier matches the second identifier set.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
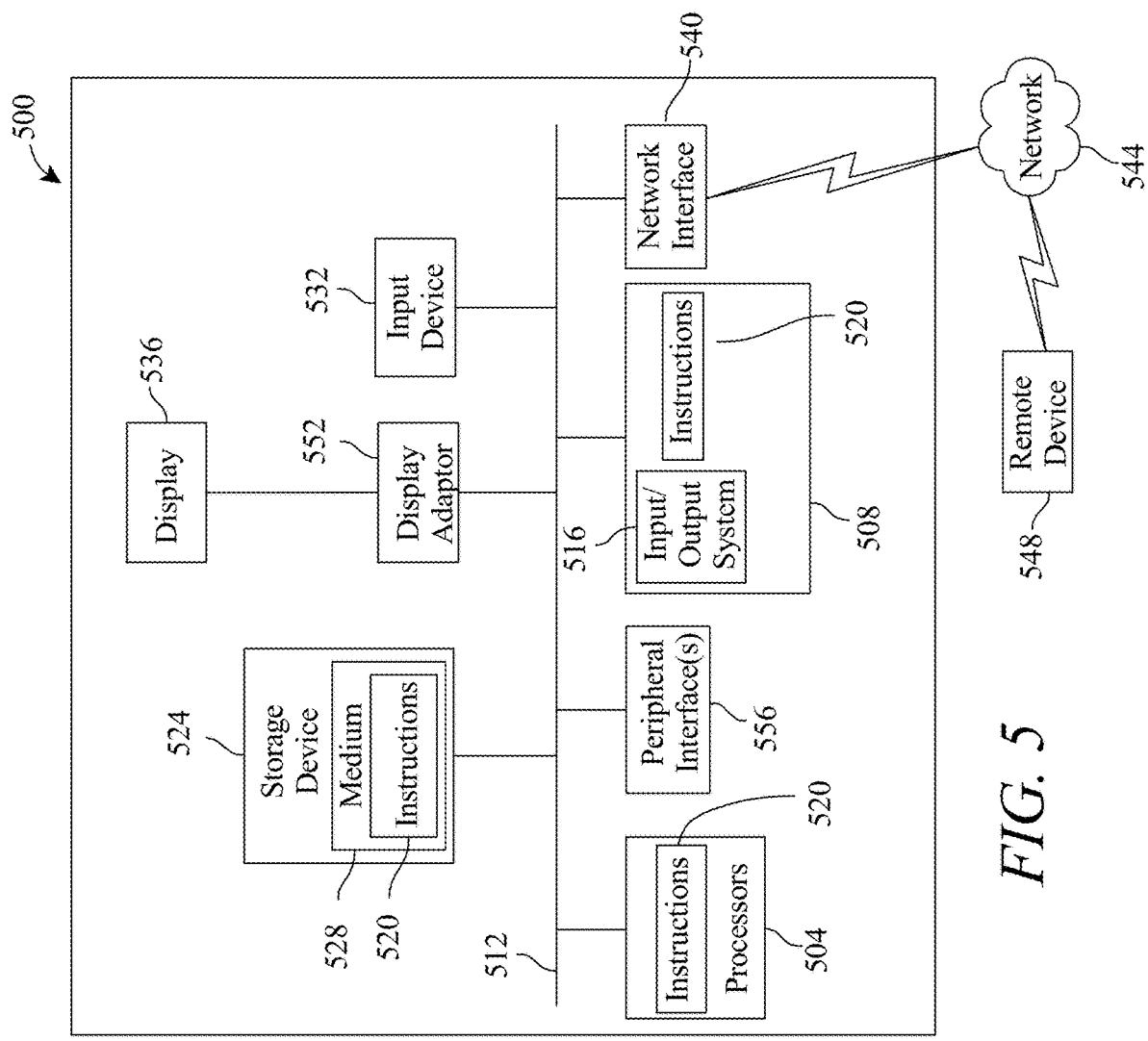
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for device-specific event handler generation, the system comprising a computing device including at least a processor and a memory storing instructions, the computing device configured to:
   configure a first remote device to display an event handler graphic corresponding to a data-reception event handler;
   receive from the first remote device a plurality of data generated by the data-reception event handler;
   compare the data to at least a memory map index;
   retrieve at least a memory entry linked to the memory map index;
   divide a device identifier space into a first identifier set and a second identifier set as a function of the at least a memory entry, wherein the first identifier set and the second identifier set are disjoint; and
   configure the first remote device to generate a graphical view, wherein the graphical view includes:
   at least a display element generated as a function of the at least a memory entry; and
   a first selectable event graphic corresponding to a first selectable event handler, wherein the first selectable event handler is configured to trigger a first action if first remote device identifier corresponding to the first remote device matches the first identifier set and a second action if the first remote device identifier matches the second identifier set.

2. The system of claim 1, wherein the computing device is configured to derive at least a first remote device location datum corresponding to a current location of the first remote device.

3. The system of claim 2, wherein deriving the first remote device location datum further comprises receiving the first remote device location datum from the first remote device.

4. The system of claim 2, wherein deriving the first remote device location datum further comprises deriving the first remote device location datum using internet protocol geolocation.

5. The system of claim 1, wherein the computing device is configured to determine the first remote device identifier.

6. The system of claim 1, wherein determining the first remote device identifier further comprises:
   identifying device fingerprint data of the first remote device; and
   determining the first remote device identifier from the device fingerprint data.

7. The system of claim 1, wherein determining the first remote device identifier further comprises:
   receiving a digital signature from the first remote device; and
   determining the first remote device identifier from the digital signature.

8. The system of claim 1, wherein the first action triggers display of secured data.

9. The system of claim 1, wherein the second action generates an electronic communication to a second remote device.

10. The system of claim 9, wherein:
    the first remote device identifier belongs to the first identifier set;
    the second remote device has a second remote device identifier that belongs to the second identifier set;
    the electronic communication includes a second selectable event graphic corresponding to a second selectable event hander; and
    the second selectable event graphic is configured to trigger a first action if selected from the first remote device and a second action selected from the second remote device.

11. A method of device-specific event handler generation, the method comprising:
    configuring, by a computing device, a first remote device to display an event handler graphic corresponding to a data-reception event handler;
    receiving, by the computing device and from the first remote device, a plurality of data generated by the data-reception event handler;
    comparing, by the computing device, the data to at least a memory map index;
    retrieving, by the computing device, at least a memory entry linked to the memory map index;
    dividing, by the computing device, a device identifier space into a first identifier set and a second identifier set as a function of the at least a memory entry, wherein the first identifier set and the second identifier set are disjoint; and
    configuring, by the computing device, the first remote device to generate a graphical view, wherein the graphical view includes:
    at least a display element generated as a function of the at least a memory entry; and
    a first selectable event graphic corresponding to a first selectable event handler, wherein the first selectable event handler is configured to trigger a first action if first remote device identifier corresponding to the first remote device matches the first identifier set and a second action if the first remote device identifier matches the second identifier set.

12. The method of claim 11, wherein the computing device is configured to derive at least a first remote device location datum corresponding to a current location of the first remote device.

13. The method of claim 12, wherein deriving the first remote device location datum further comprises receiving the first remote device location datum from the first remote device.

14. The method of claim 12, wherein deriving the first remote device location datum further comprises deriving the first remote device location datum using internet protocol geolocation.

15. The method of claim 11, wherein the computing device is configured to determine the first remote device identifier.

16. The method of claim 11, wherein determining the first remote device identifier further comprises:
   identifying device fingerprint data of the first remote device; and
   determining the first remote device identifier from the device fingerprint data.

17. The method of claim 11, wherein determining the first remote device identifier further comprises:
   receiving a digital signature from the first remote device; and
   determining the first remote device identifier from the digital signature.

18. The method of claim 11, wherein the first action triggers display of secured data.

19. The method of claim 11, wherein the second action generates an electronic communication to a second remote device.

20. The method of claim 19, wherein:
   the first remote device identifier belongs to the first identifier set;
   the second remote device has a second remote device identifier that belongs to the second identifier set;
   the electronic communication includes a second selectable event graphic corresponding to a second selectable event hander; and
   the second selectable event graphic is configured to trigger a first action if selected from the first remote device and a second action if selected from the second remote device.

* * * * *